United States Patent [19]
Gohi

[11] Patent Number: 5,357,420
[45] Date of Patent: Oct. 18, 1994

[54] INTEGRATED CONTROL SYSTEM

[75] Inventor: Tetsuji Gohi, Tokyo, Japan

[73] Assignee: Kabushiki Kaisha Toshiba, Kanagawa, Japan

[21] Appl. No.: 950,141

[22] Filed: Sep. 24, 1992

[30] Foreign Application Priority Data

Sep. 30, 1991 [JP] Japan .................. 3-252489

[51] Int. Cl.⁵ .............................................. G06F 15/46
[52] U.S. Cl. ........................... 364/131; 364/138;
364/DIG. 2; 364/221.9; 364/228.5; 395/325
[58] Field of Search ............... 364/131, 132, 133, 134,
364/138, 139, DIG. 1, DIG. 2; 395/200, 275,
325; 340/825.06, 825.07

[56] References Cited

U.S. PATENT DOCUMENTS 4,447,871 5/1984 Terada et al. .................. 364/200
4,500,951 2/1985 Sugimoto et al. ............. 364/200 X
4,607,256 8/1986 Henzel ........................... 364/133 X Primary Examiner—Joseph Ruggiero
Attorney, Agent, or Firm—Finnegan, Henderson Farabow, Garrett & Dunner

[57] ABSTRACT

A system performing an integrated control of a plurality of independent control system. Each of a plurality of control terminals controls the independent control systems. A plurality of interface control devices perform interface control between the independent control system and each of the control terminals. A first switching device switches connections between the control systems and each of the interface control devices. A second switching control device switches connections between each of the interface control devices and each of the control terminals. An external control terminal supplies external instructions to the control device which control the first and second switching devices.

3 Claims, 3 Drawing Sheets

INTEGRATED CONTROL SYSTEM

BACKGROUND OF THE INVENTION

This invention relates to a large-scale control system. In particular, it relates to an integrated control system capable of integratedly controlling a plurality of independent control systems.

In recent years, due to the increase in the volume of information with the advancement of systems, the requirement for grasping the states of systems swiftly and accurately has increased. Therefore, a plurality of process controllers and man/machine interface control systems (hereinafter, MMI systems') are connected through high-speed LAN, and a practical control system which executes monitoring and control of the system on a display device composed of a CRT fitted with a touch screen has been developed.

When controlling a large-scale system to be controlled, as shown in FIG. 1, it is the general practice to construct multiple independent control systems.

However, in this case, since each control system is completely independent, the ability to monitor and control by a single display device is limited to each independent control system.

Since each of the multiple control systems is independent in this way, users' dissatisfaction has accumulated over the fact that monitoring and controlling multiple control systems with a single display device is not possible.

SUMMARY OF THE INVENTION

It is an object of the invention to integratedly control a plurality of independent control systems.

Another object is to make it possible to perform an integrated control of a plurality of independent control systems by a single control terminal.

In order to achieve the above objects according to one aspect of the invention, an integrated control system is provided. The integrated control system includes a plurality of independent control systems, each of the independent control systems having a data transmission channel; a plurality of control terminal means for controlling the independent control systems; a plurality of interface control means for performing interface control between the independent control systems and each of the control terminal means; first switching means for switching connections between each of the control systems and each of the interface control means: second switching means for switching connections between each of the interface control means and each of the control terminals; control means for controlling the first and second switching means in response to an external instruction; and external control terminal means for supplying the external instruction.

According to another aspect of the invention, a method of integratedly controlling a plurality of independent control systems is provided. The method of integatedly controlling a plurality of independent control systems by each of a plurality of control terminals through a plurality of interface control means, comprising the steps of: monitoring each of the independent control systems; performing interface control between each of the independent control systems and each of the control terminals by the interface control means; switching connections between each of the control systems and each of the interface control means; switching connections between each of the interface control means and each of the control terminals; controlling the first and second switching connections in response to an external instruction; and supplying the external instruction.

DETAILED DESCRIPTION OF THE PREFERRED EMBODIMENTS

The following is a description of an embodiment of this invention with reference to the drawings.

Figure 1:
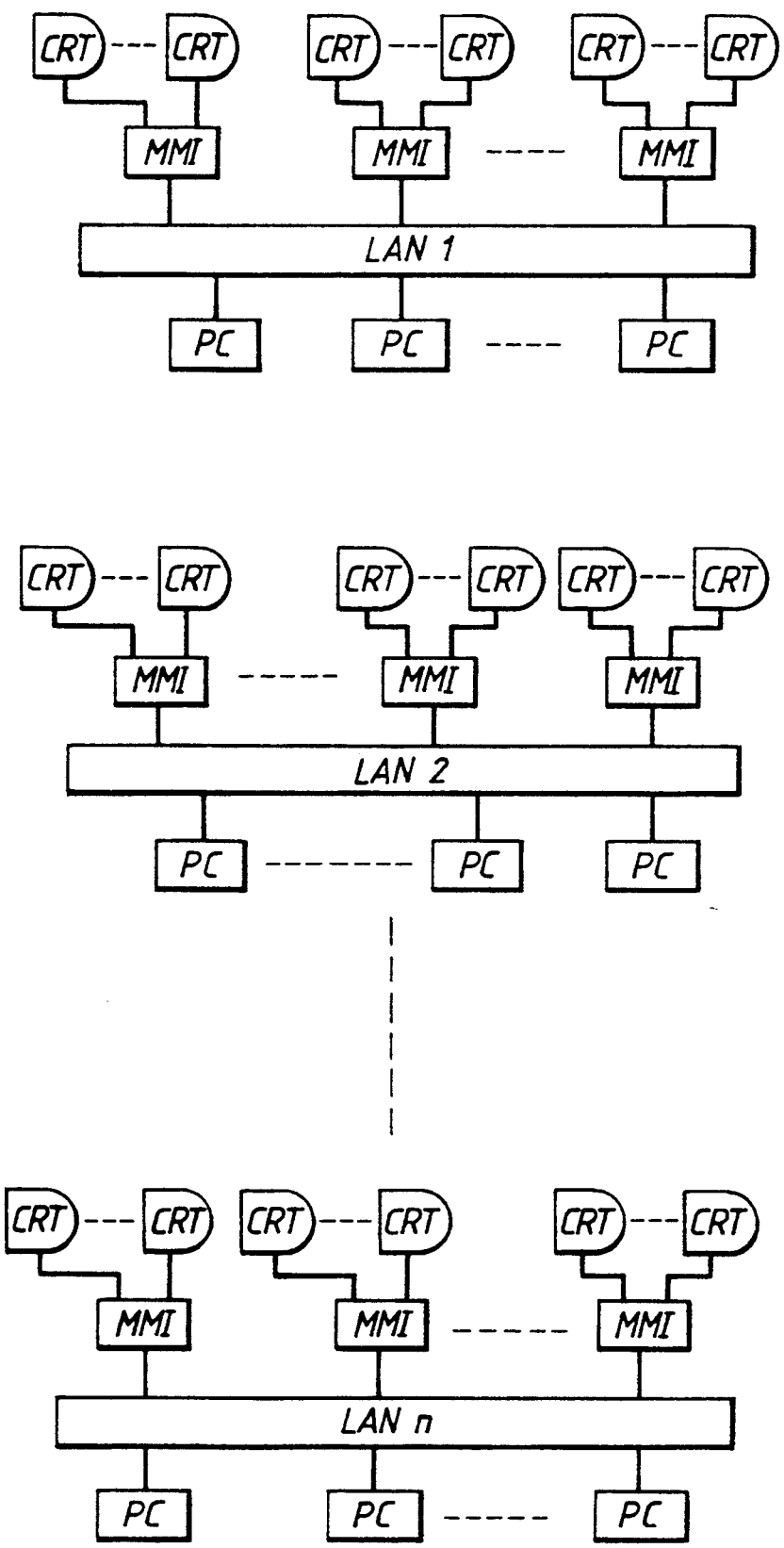
FIG. 1 is a block diagram showing a plurality of independent control systems.
Figure 2:
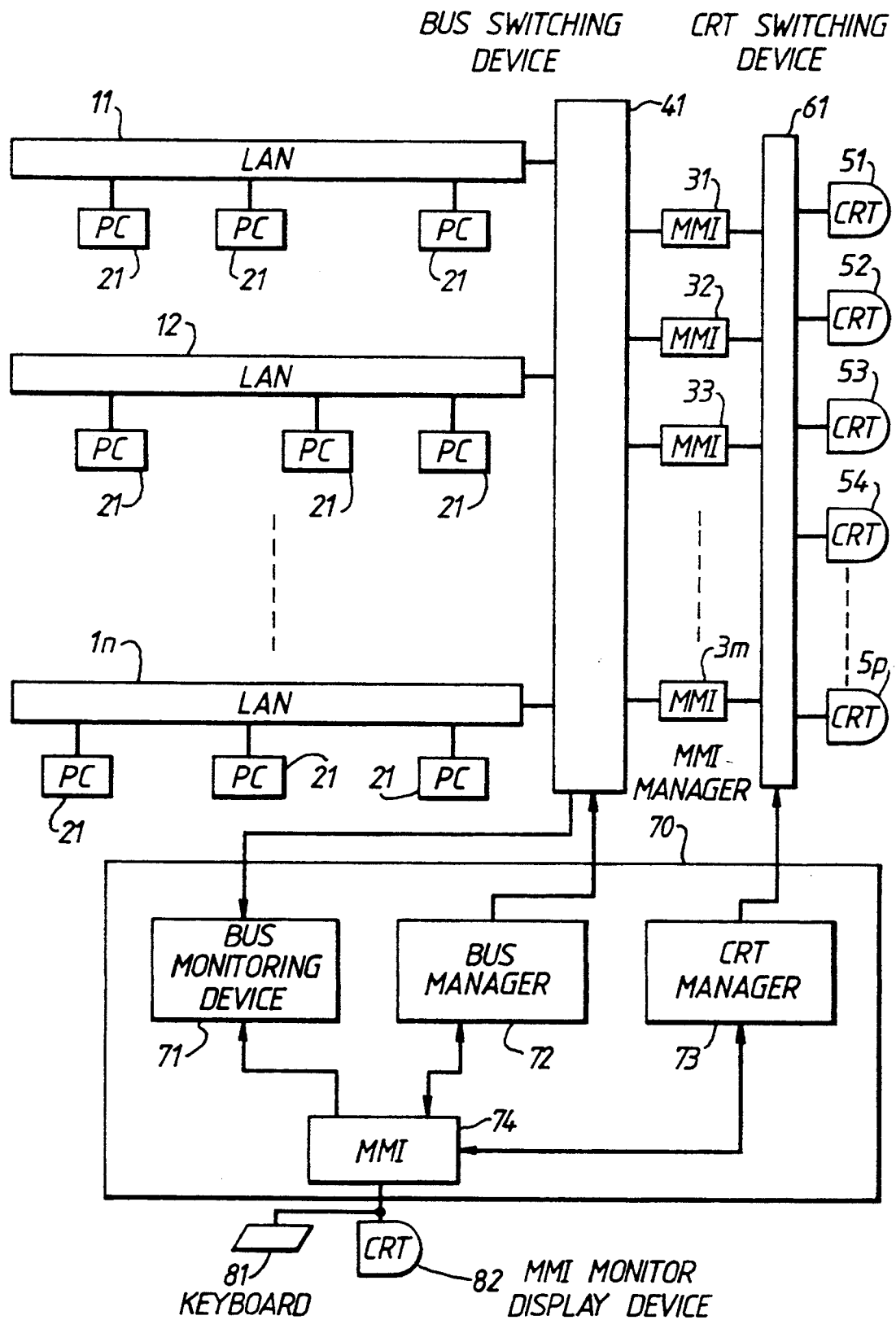
FIG. 2 is a block diagram showing of an integrated control system according to an embodiment of this invention.

FIG. 2 is a block diagram showing an integrated control system according to an embodiment of the invention.

In FIG. 2, a plurality of process control stations 21 are connected to LAN buses 11-1$n$ in each independent control system. Also, bus switching device 41, for switching the connections of multiple man/machine interface control systems (hereinafter, 'MMI systems') 31-3$m$ is connected to LAN buses 11-1$n$. Moreover, there are display devices composed of CRTs fitted with touch screens which execute monitoring and control of the system under the control of MMI devices 31-3$m$. CRT switching device 61 for switching the respective connections is inserted between display devices 51-5$p$ and each MMI device 31-3$m$. Also, MMI manager 70 is connected to bus switching device 41 and CRT switching device 61. This MMI manager 70 is composed of bus monitoring device 71, bus manager 72, CRT manager 73 and MMI device 74. Bus monitoring device 71 monitors the states of each LAN bus 11-1$n$. Bus manager 72 controls connections between LAN buses 11-1$n$ and MMI devices 31-3$m$ in bus switching device 41. CRT manager 73 controls the connections between MMI devices 31-3$m$ and display devices 51-5$p$ in CRT switching device 61. MMI device 74 executes man/machine interface control between MMI manager 70 and keyboard 81 and MMI monitor display device 82 which are connected to it.

The following is a description of the operation of this integrated control system.

One of the characteristics of the control system in this embodiment is that the connection between LAN buses 11-1$n$ and MMI devices 31-3$m$ in bus switching device 41 can be freely switched. The operation in this case is described below.

First, the operator inputs the information for the LAN bus and the MMI devices which he wishes to connect as bus selection information through keyboard 81 or MMI monitoring display device 82 composed of a CRT fitted with a touch screen, which are both connected to MMI manager 70, to bus manager 72 via MMI device 74 of MMI manager 70.

Figure 3:
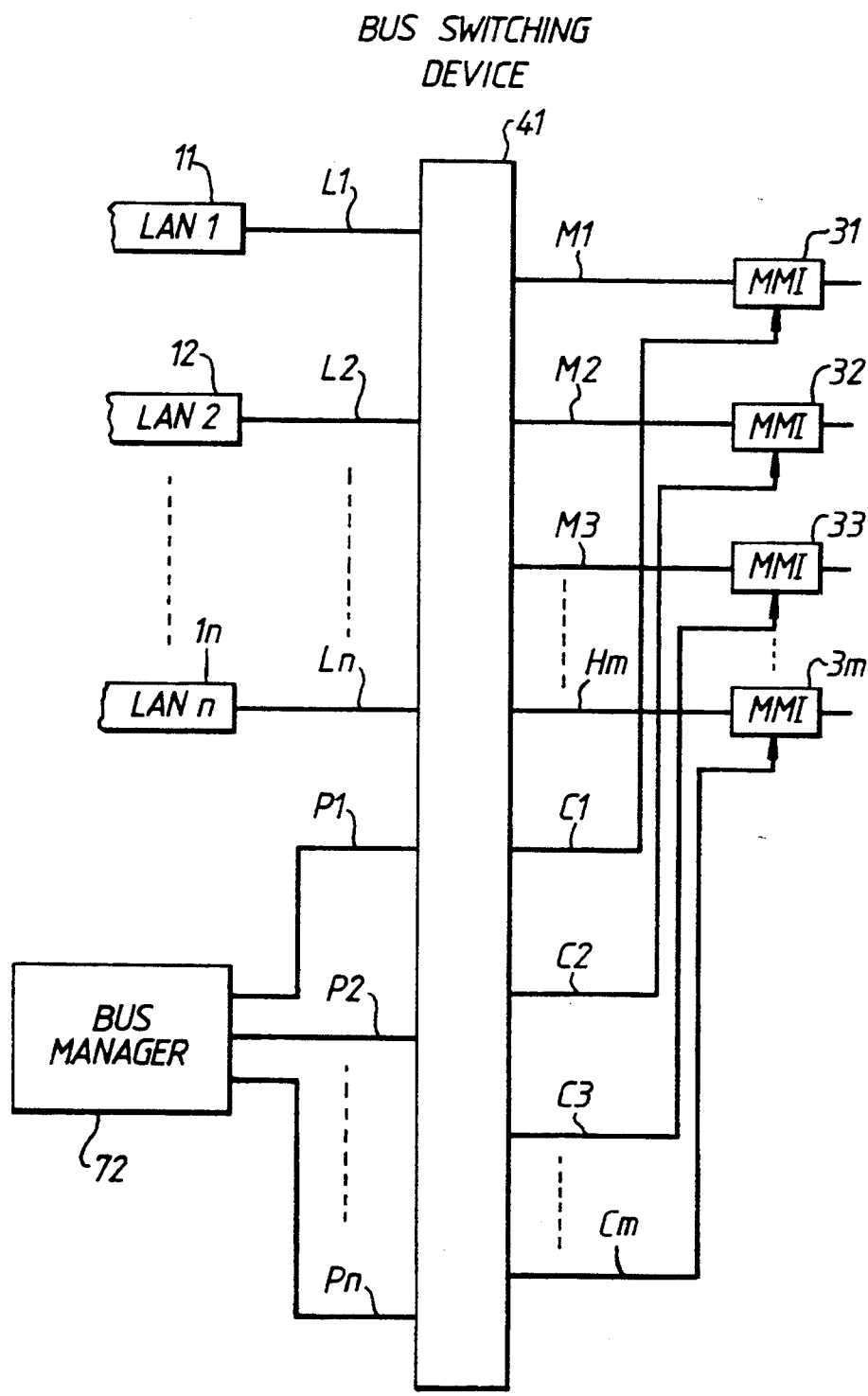
FIG. 3 is a block diagram illustrating an information flow in the connections between the LAN bus and MMI devices in the integrated control system shown in FIG. 2.

Based on the inputted bus selection information, bus manager 72 supplies an instruction to bus switching device 41 for connection between the relevant LAN bus and MMI devices. On receipt of this instruction, bus switching device 41 executes a switching operation to connect the target LAN bus and MMI devices. By this means, as shown in FIG. 3, mutual communication of the system information L1-L$n$ of the designated LAN and the MMI information M1-M$m$ of the designated MMI devices becomes possible. At the same time, it becomes possible to input LAN control information P1-P$n$ corresponding to the designated LAN as MMI control information C1-C$m$ of the designated MMI devices. MMI devices 31-3$m$ execute monitoring and control of the control system based on inputted information M1-M$m$ and MMI control information C1-C$m$.

The following is a description of the connection switching operation between MMI devices 31-3$m$ and display devices 51-5$p$, which is another special feature in this embodiment system.

In this case, the setting of the MMI devices 31-3$m$ and the display devices 51-5$p$ to be connected can be executed by keyboard 81 and monitor display device 82, which are connected to MMI manager 70. Alternatively, the system can be constructed so that setting can be carried out by each display device 51-5$p$ which is to be the subject of connection switching.

The setting information for this connection is inputted to CRT manager 73 via MMI device 74 of MMI manager 70. Based on this setting information, CRT manager 73 supplies an instruction to CRT switching device 61 for connection between the relevant MMI devices and display devices. On receipt of this instruction, CRT switching device 61 executes a switching operation so that the target MMI devices and display devices are connected.

At the same time, bus monitoring device 71 of MMI manager 70 monitors bus information L1-L$n$ of each LAN via bus switching device 41. The result of this monitoring is displayed on MMI monitoring display device 82 via MMI device 74.

In this way, when using the integrated control system of this embodiment, the monitoring and operation of each control system can be executed through any MMI device 31-3$m$ and any display device 51-5$p$. Moreover, any number of MMT devices 31-3$m$ and display devices 51-5$p$ may be set.

Furthermore, when using this integrated control system, connection between MMI devices 31-3$m$ and display devices 51-5$p$ can be switched by setting from display devices 51-5$p$. Therefore, display devices 51-5$p$ which are capable of operating can be freely selected according to the load conditions of each control system.

When using the integrated control system of this invention as described above, monitoring and control of a plurality of independent control systems can be carried out through any man/machine interface control device and display device. Therefore, it is possible to design for improved reliability when a system is operating.

What is claimed is:

1. An integrated control system comprising:
   a plurality of independent control systems, each of the independent control systems having a data transmission channel;
   a plurality of control terminal means for controlling the independent control systems;
   a plurality of interface control means for performing interface control between the independent control systems and each of the control terminal means;
   first switching means for switching connections between each of the control systems and each of the interface control means;
   second switching means for switching connections between each of the interface control means and each of the control terminal means;
   control means for controlling the first and second switching means in response to an external instruction; and
   external control terminal means for supplying the external instruction,
   wherein the control means includes bus monitor means for monitoring states of the data transmission channels of the independent control systems, first switching control means for controlling the first switching means, second switching control means for controlling the second switching means, and interface means connected to the bus monitor means for performing interface control between the external control terminal means and the first and second switching control means.

2. A method of integratedly controlling a plurality of independent control systems, each having a data transmission channel, by each of a plurality of control terminal means through a plurality of interface control means, comprising the steps of:
   monitoring states of the data transmission channels of the independent control systems;
   performing interface control between the independent control systems and each of the control terminal means by the interface control means;
   switching connections between each of the control systems and each of the interface control means;
   switching connections between each of the interface control means and each of the control terminal means;
   controlling the connections switching steps in response to an external instruction; and
   supplying the external instruction.

3. The method of claim 2, wherein the step of controlling includes the step of performing interface control between the external instruction and the first and second switching connections.

* * * * *